US005844466A

United States Patent [19]

Fraisse

[11] Patent Number: 5,844,466

[45] Date of Patent: Dec. 1, 1998

[54] BIMETALLIC THERMAL TRIGGERING APPARATUS FOR A PROTECTION DEVICE

[75] Inventor: Alain Fraisse, Quetigny, France

[73] Assignee: Schneider Electric SA, Boulogne Billancourt, France

[21] Appl. No.: 908,523

[22] Filed: Aug. 7, 1997

[30] Foreign Application Priority Data

Sep. 23, 1996 [FR] France .................................. 96 11649

[51] Int. Cl.[6] .......................... H01H 37/52; H01H 61/00; H02H 3/00; H02H 5/04

[52] U.S. Cl. .............................. 337/379; 337/16; 337/49; 337/45; 361/93; 361/103; 361/105

[58] Field of Search .................................... 337/379, 378, 337/373, 66, 70, 99, 111, 109, 36–43; 361/93–98, 103–106

[56] References Cited

U.S. PATENT DOCUMENTS

| | | | |
|---|---|---|---|
| 2,406,325 | 8/1946 | Dorfman . | |
| 4,000,484 | 12/1976 | Ellenberger et al. | 337/109 |
| 4,884,049 | 11/1989 | Oyama et al. | 337/36 |

FOREIGN PATENT DOCUMENTS

| | | | |
|---|---|---|---|
| 0 031 577 | 7/1981 | European Pat. Off. . | |
| 0 291 835 | 11/1988 | European Pat. Off. . | |
| 2 553 928 | 4/1985 | France . | |
| 2 228 829 | 9/1990 | United Kingdom . | |
| 2228829 | 9/1990 | United Kingdom | H01H 71/76 |

*Primary Examiner*—Lynn D. Feild
*Assistant Examiner*—Anatoly Vortman
*Attorney, Agent, or Firm*—Oblon, Spivak, McClelland, Maier & Neustadt, P.C.

[57] ABSTRACT

Thermal triggering apparatus, for a protection device featuring an electrically conductive bimetallic strip and a plate of thickness (e) which supports the bimetallic strip. The bimetallic strip has a first end free that is capable of deforming and a second end or foot which is fitted into a cavity in the plate characterised in that the foot of the bimetallic strip passes through the cavity so that it protrudes below the bottom face of the plate by a length (a) that easily exceeds the thickness (e) of the plate, and the protruding part of the foot has an electrical connection point linked to a conductive part so as to form the direct heating element of the bimetallic strip.

7 Claims, 1 Drawing Sheet

BIMETALLIC THERMAL TRIGGERING APPARATUS FOR A PROTECTION DEVICE

BACKGROUND OF THE INVENTION

A. Field of the Invention

This invention relates to a bimetallic thermal triggering apparatus for an electrical device which protects against excess currents, such as a thermal relay or a circuit breaker.

B. Description of the Related Art

In such an apparatus, the role of the thermal triggering device is to protect an electrical installation powered via the apparatus against excess currents, the heating up of the bimetallic strip being representative of the excess current and determining the triggering of the protection apparatus when a predetermined threshold is reached.

Generally speaking, the bimetallic strip has a first end which is free and capable of deforming, and a second end which is attached to a supporting sole plate made from a conductive material. The bimetallic strip may be mounted by fitting the second end into a cavity in the sole plate.

The bimetallic strip is usually heated by passing a current through an electrically insulated heating coil, which is in thermal contact with the bimetallic strip, however it may also be heated by passing the current directly through the bimetallic strip.

If the current passes directly through the bimetallic strip, without a heating coil being used, the current from the sole plate heats the bimetallic strip up immediately; in the case of an excess current, the free end then rapidly deforms, creating a trigger time which is particularly short.

This type of apparatus allows the protection device to be manufactured advantageously inexpensively. However, for certain electrical installations, such as for the starting of a motor, the protection device must not, in the case of an excess current, be triggered too prematurely and therefore requires a determined response time, which can only be achieved by the presence of a heating coil.

SUMMARY OF THE INVENTION

The invention hence proposes to provide a thermal triggering apparatus with a bimetallic strip without a heating coil to make a financial saving in the manufacturing cost of the protection devices, the characteristics of which permit a trigger time to be obtained which is greater than a standardised value.

In accordance with the invention, the apparatus has an electrically conductive bimetallic strip and a plate of a given thickness, acting as a support for the bimetallic strip, the first end of the bimetallic strip being free and capable of deforming and the second end, or foot, fitted into a cavity in the plate, characterised in that:

- the foot of the bimetallic strip passes through the cavity so that it protrudes below the bottom face of the plate by a distance which is easily longer than the thickness of the plate;
- the protruding part of the foot has an electrical connection on it, connected to a conductive part so as to form the direct heating element of the bimetallic strip.

The connection point is situated at a determined distance from the bottom face of the plate, so that by simply modifying this distance, the rating of the protection device may be altered.

BRIEF DESCRIPTION OF THE DRAWING

Other characteristics and advantages of the invention will become more clear in the following description, with regard to the appended drawing which is provided by way of example.

DESCRIPTION OF THE PREFERRED EMBODIMENT

Figure 1:
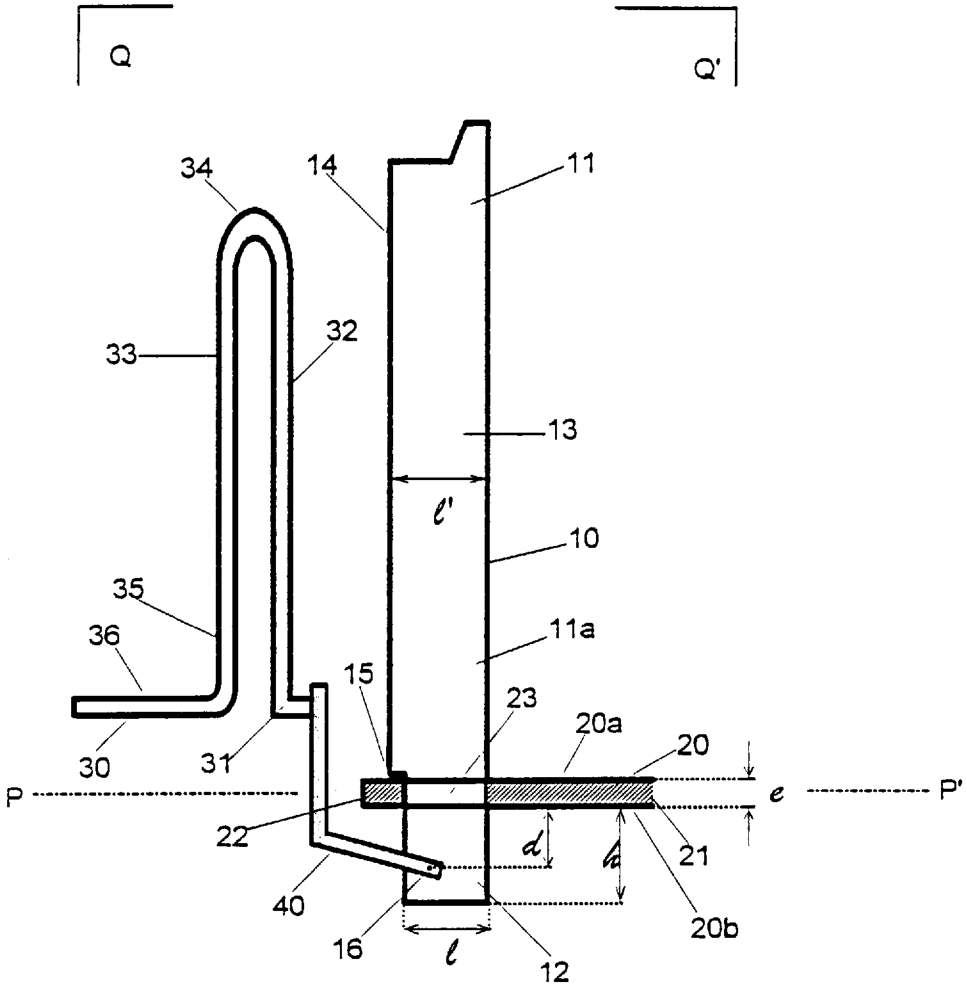
FIG. 1 is an elevation view of the apparatus of the invention.

The thermal triggering apparatus, illustrated in FIG. 1, is designed to be incorporated into an electrical protection device, for example a motor circuit breaker, to detect excess currents after a certain period of time.

The thermal triggering apparatus has a bimetallic strip 10 which directly forms the heating element.

The bimetallic strip 10 is attached to a support plate 20; the plate 20 is made from an electrically conductive material and is connected by its first end 21 to a conductive part of the current output not shown, connected to a power pole of the circuit breaker.

The bimetallic strip 10 is thin, of a rectangular shape overall extending in a plane QQ'. It has a first end free 11 which is capable of deforming, and a second end or foot 12 designed to be connected electrically to a current input conductive part 30, connected to a connection terminal.

The support plate 20 of an overall rectangular shape, of given thickness e, extends in a plane PP' that is perpendicular to the plane QQ'. Close to its second end 22, it features a rectangular cavity 23 that extends in parallel to the longitudinal direction of the plate.

The bimetallic strip 10 passes through the plate 20 via the cavity 23, with its two large opposite lateral faces 13 situated in the plane QQ', in parallel to the longitudinal direction of the plate. The width of the cavity 23 is suited to the thickness of the bimetallic strip, so that it may be fitted into the cavity.

The bimetallic strip has on one of its longitudinal sections 14 a shoulder 15, which touches against the top face 20*a* of the plate 20, so that the bimetallic strip may be seated on the plate. The shoulder 15 is positioned so that the foot 12 of the bimetallic strip protrudes by a length a below the bottom face 20*b* of the plate 20.

The width l of the foot 12 of the bimetallic strip below the shoulder 15 is at maximum equal to the width l' of the top half 11*a* of the bimetallic strip situated above the plate.

The bimetallic strip 10 is mechanically attached to the plate 20 by soldering, for example laser soldering, which may be made on the top face 20*a* of the plate and/or on its bottom face 20*b*. Furthermore, soldering helps to improve the electrical connection between the bimetallic strip 10 and the plate 20.

The protruding part of the foot 12 of the bimetallic strip is electrically connected to the conductive part 30 by a connector braid 40; the braid 40 is soldered on one side to an electrical connection point 16 on the foot 12 and on the other side to an end 31 of the part 30. The connector braid 40 can also be a metal strip or an extension of the conductive part 30.

The connection point 16 is selected on the length a at a determined distance d, which depends on the rating of the electrical device. It is advantageously made on the foot 12 and not on the top half 11*a* of the bimetallic strip, in order to avoid damaging the latter. The bimetallic strip is therefore directly heated at the foot 12 and the solder joint between the foot and the plate.

It is known that the heat power required to deform the end 11 of the bimetallic strip remains virtually constant, it is therefore necessary to be able to modify the ohmic resistance R of the bimetallic strip to suit the rating of the device. The ohmic resistance R becomes smaller as the rating of the device, which is representative of the nominal current, increases.

The resistance R may thus be modified by the distance d and the width l of the foot 12. The distance d becomes smaller as the rating increases, and the width l narrows as the rating decreases.

It is also possible to adapt the resistance R, especially to reduce it, for an intermediate layer of copper to be fitted to the bimetallic strip.

Finally, the conductive part 30 extends in a plane which is perpendicular to the plane PP'; it has a rising arm 32, the bottom half of which is connected to the connector braid 40, and a descending arm 33, whose bent top end 34 is connected to the top end of the rising arm 32. The descending arm 33 has at its bottom end 35 a bent extension 36 which is perpendicular to the arms 32, 33 and which is parallel to the PP' plane; the extension 36 is electrically connected to a connection terminal (not shown).

The shape of the part 30 allows a temperature gradient to be obtained between the bimetallic strip 10 and the current input connection terminal that is sufficient for the temperature of the terminal to be low in comparison with that of the bimetallic strip.

I claim:

1. Thermal triggering apparatus for a protection device comprising:

an electrically conductive bimetallic strip having a deformable first free end, a foot having a width, and a top half having a width;

said plate supporting said bimetallic strip;

a plate having a thickness, a bottom face, a top face, and defining a cavity;

the foot of said bimetallic strip fitted into the cavity defined by said plate and passed through the cavity so that a protruding part of the foot protrudes below the bottom face of said plate by a length that substantially exceeds the thickness of said plate;

the protruding part of the foot having an electrical connection point linked to a conductive part so as to form a direct heating element of the bimetallic strip; and the connection point situated at a determined distance from the bottom face of the plate, to suit the rating of the device, wherein said plate is made from an electrically conductive material and is connected to said conductive part, whereby an electrical current flows through the foot of said bimetallic strip between said connection point and said plate.

2. Thermal triggering device according to claim 1, wherein the width of the protruding part of the foot is at a maximum equal to the width of the top half of the bimetallic strip such that the top half of the bimetallic strip is situated above the plate so as to form a shoulder that is supported by the top face of the plate when the foot of the bimetallic strip is passed through the plate.

3. The triggering apparatus according to claim 2, wherein the conductive part has a rising arm whose bottom end is connected electrically to the connection point, and a descending arm having a bent top end connected to the rising arm, the descending arm having at its bottom end a bent extension which is perpendicular to the arms and electrically connected to a connection terminal.

4. The triggering apparatus according to claim 1, wherein the conductive part has a rising arm whose bottom end is connected electrically to the connection point, and a descending arm having a bent top end connected to the rising arm, the descending arm having at its bottom end a bent extension which is perpendicular to the arms and electrically connected to a connection terminal.

5. Thermal triggering apparatus for a protection device comprising:

an electrically conductive bimetallic strip having a deformable first free end, a foot having a width, and a top half having a width;

said plate supporting said bimetallic strip;

a plate having a thickness, a bottom face, a top face, and defining a cavity;

the foot of said bimetallic strip fitted into the cavity defined by said plate and passed through the cavity so that a protruding part of the foot protrudes below the bottom face of said plate by a length that substantially exceeds the thickness of said plate;

the protruding part of the foot having an electrical connection point linked to a conductive part so as to form a direct heating element of the bimetallic strip; and the width of the protruding part of the foot at a maximum equal to the width of the top half of the bimetallic strip such that the top half of the bimetallic strip is situated above the plate so as to form a shoulder that is supported by the top face of the plate when the foot of the bimetallic strip is passed through the plate.

6. The triggering apparatus according to claim 5, wherein the conductive part has a rising arm whose bottom end is connected electrically to the connection point, and a descending arm having a bent top end connected to the rising arm, the descending arm having at its bottom end a bent extension which is perpendicular to the arms and electrically connected to a connection terminal.

7. Thermal triggering apparatus for a protection device comprising:

an electrically conductive bimetallic strip having a deformable first free end, a foot having a width, and a top half having a width;

a plate having a thickness, a bottom face, a top face, and defining a cavity;

said plate supporting said bimetallic strip;

the foot of said bimetallic strip fitted into the cavity defined by said plate and passed through the cavity so that a protruding part of the foot protrudes below the bottom face of said plate by a length that substantially exceeds the thickness of said plate;

the protruding part of the foot having an electrical connection point linked to a conductive part so as to form a direct heating element of the bimetallic strip; and the conductive part having a rising arm whose bottom end is connected electrically to the connection point, and a descending arm having a bent top end connected to the rising arm, the descending arm having at its bottom end a bent extension which is perpendicular to the arms and electrically connected to a connection terminal.

* * * * *